July 6, 1954 V. M. YOUNG 2,682,931
MEANS FOR ABSORBING ENERGY DUE TO SUDDEN IMPACT
Filed March 3, 1950 2 Sheets-Sheet 1
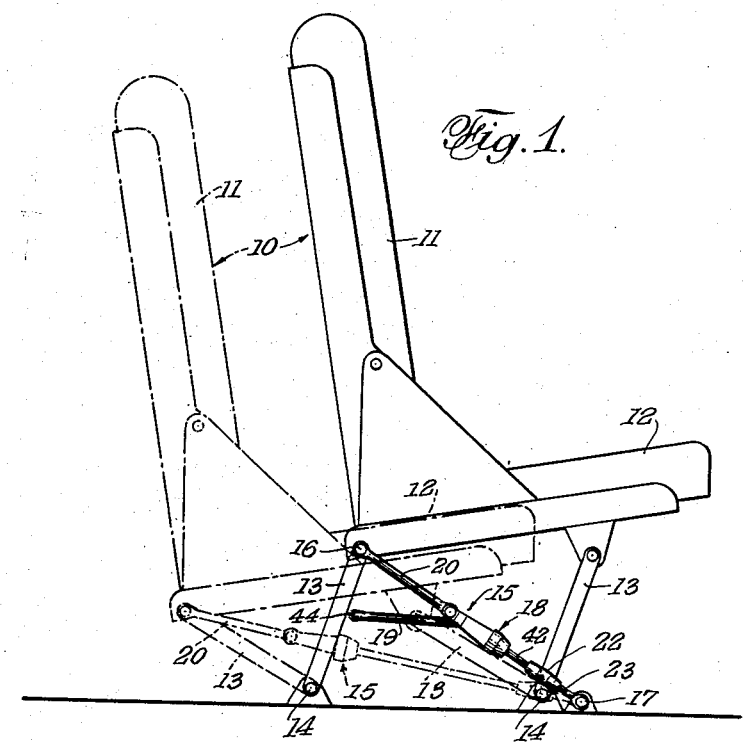
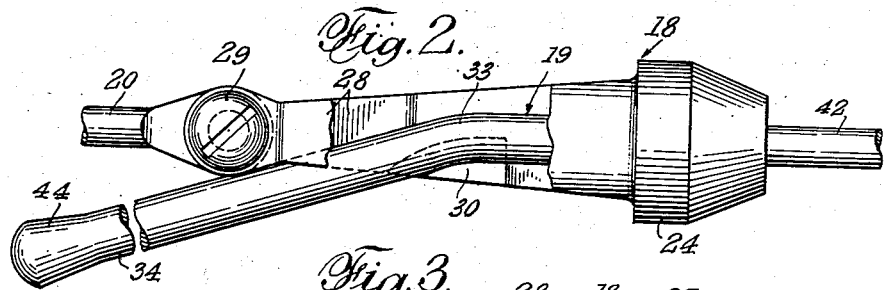
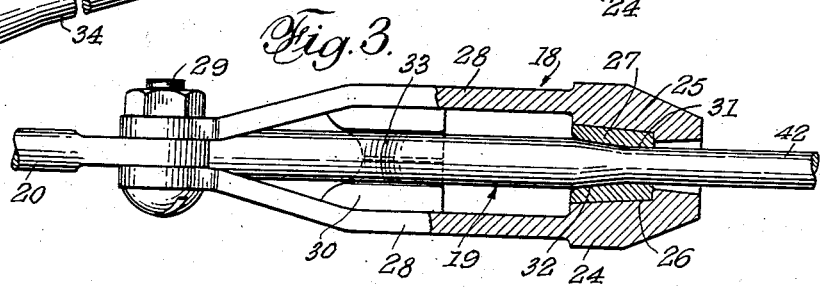
Inventor
VICTOR M. YOUNG
By C. G. Stratton
Attorney July 6, 1954  V. M. YOUNG  2,682,931
MEANS FOR ABSORBING ENERGY DUE TO SUDDEN IMPACT
Filed March 3, 1950  2 Sheets-Sheet 2
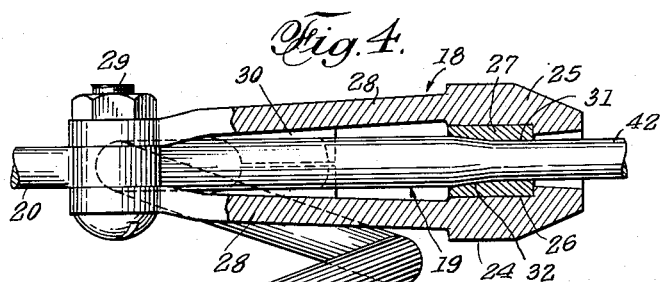
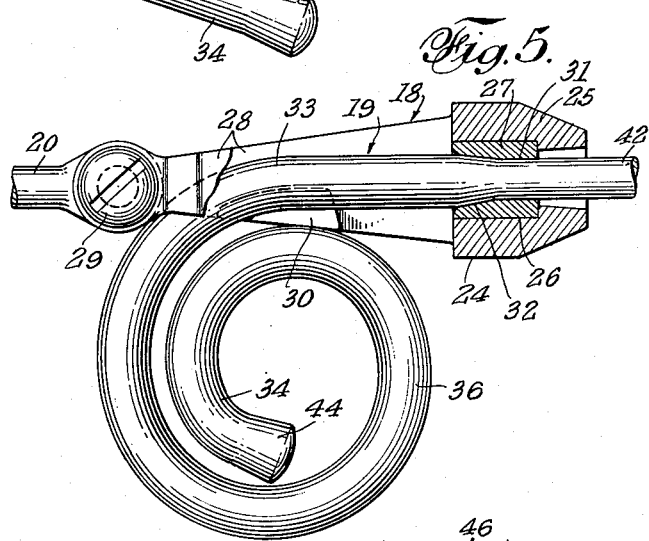
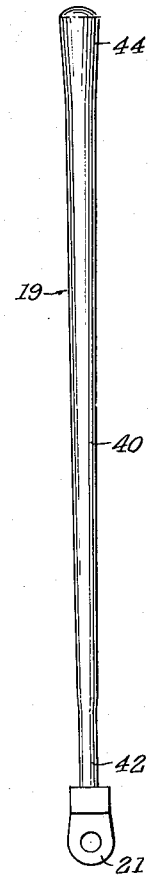
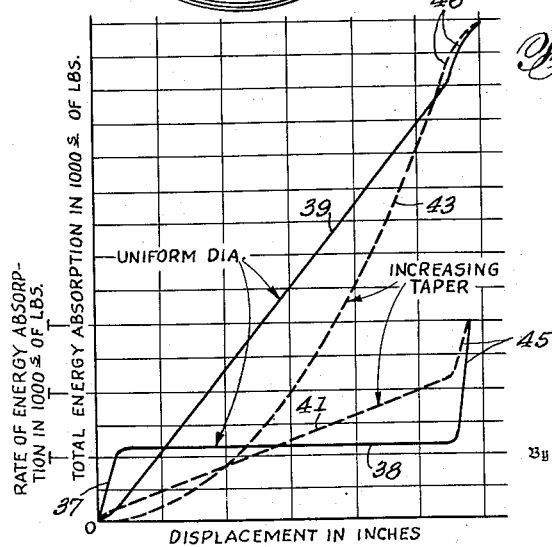
Inventor
VICTOR M. YOUNG
C. G. Stratton
Attorney Patented July 6, 1954

2,682,931

UNITED STATES PATENT OFFICE 2,682,931

MEANS FOR ABSORBING ENERGY DUE TO SUDDEN IMPACT

Victor M. Young, Huntington Park, Calif.

Application March 3, 1950, Serial No. 147,385

5 Claims. (Cl. 188—1)

This invention relates to devices for absorbing energy due to shock and to like sudden impacts.

Shock absorbers have a wide range of use in the automotive field, in aviation, and in other fields. Reference is made to application Serial No. 177,943, filed August 5, 1950. Invariably, shock absorbers employ elastic or resilient elements for effecting gradual dispersal or absorption of shocks. However, absorbers designed to smoothen normal shocks have little or no value to absorb the shocks of impact.

The aviation field, particularly, has need for effective means for safely accelerating or decelerating equipment and/or the personnel occupying such equipment. Elastic or resilient means now employed have not effected safe acceleration or deceleration under conditions of extreme shock as in emergency or crash landings of aircraft.

The present invention has basis on the absorption of forces attending the extrusion of a malleable member through a hardened die, wherein the member becomes permanently attenuated. Accordingly, the critical means of the devices herein contemplated is non-elastic in contradistinction to the elastic means of presentknown devices.

An object of the present invention is to provide non-elastic energy absorbing means for use in the prevention of injury to life and/or property subjected to rapid acceleration or deceleration and for safely absorbing the energy resulting from such rapid change of movement rate.

Another object of the invention is to provide non-elastic energy absorbing means, as above, which is adapted to provide a uniform rate of energy absorption, an increasing rate of absorption, or a decreasing rate of absorption, as the case may be, all relative to a movement displacement of predetermined distance.

Still another object of the invention is to provide non-elastic energy absorbing means having high total absorption, low unit weight and few parts, and having permanent and uniform operating characteristics.

A further object of the invention is to provide nonelastic energy absorbing means having accurate predetermined energy absorption values and useful for testing equipment subjected to the forces comparable to those met under actual operating conditions.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a side elevational view showing one manner of application of the present energy absorbing means.

Fig. 2 is an enlarged side elevational view, partly broken away, of one form of energy absorbing unit contemplated herein.

Fig. 3 is a longitudinal sectional view, partly in elevation, as seen from the top of Fig. 2.

Figs. 4 and 5 are views similar to Fig. 3 showing two other forms of energy absorbing units.

Fig. 6 is a side view of a tapered element employed for obtaining an increasing rate of energy absorption.

Fig. 7 is a diagram showing, in graph form, the characteristics of two forms of the present means.

Without attempting to exhaust the various applications to which the present energy absorbing means may be put, by way of example, the same may be used in connection with safety seats to allow both the seat and occupant to move under the forces resulting from sudden impact to, thereby, protect the seat and occupant from the deleterious effects of unduly rapid acceleration or deceleration. Since the occupants may vary in weight with a resultant variation in loading, the energy absorbing means may be the type that has an increasing rate of absorption. Fig. 1 shows such an installation for a rearwardly facing seat and it will be evident that a comparable arrangement may be provided for a forwardly facing seat. In the form shown, since the seat back gives support to the occupant when moving forwardly under rapid deceleration, the usual lap belt will serve to hold the occupant in the seat. For forwardly facing seats, it is preferable to employ a safety harness. Neither the belt nor harness is shown since the same are generally well known and do not comprise part of the present invention. It is evident that the present invention is adapted for use on either the seats of aircraft pilots or the safety harnesses they employ, or both, as desired.

Another application of the present invention is on parachutes to protect the parachutist from injury that may be caused by 'chute opening shock resulting from high take-off speed or excessive canopy size.

Also, the present means may be used in connection with safety barriers at the ends of airfield runways or on aircraft carriers to absorb the energy required to decelerate aircraft to a stop within a safe distance.

A variation of the safety barrier comprises a transversely arranged cable that is engaged by an aircraft and it is evident that either the ends of such a cable or the aircraft itself may be provided with energy absorbing means according to the present invention.

Accordingly, the safety seat 10, that is shown in Fig. 1, is intended as exemplary of a device or person that is adapted to be decelerated or accelerated in a safe manner under conditions of a sudden impact or a sudden movement from a condition of immobility.

The safety seat 10 conventionally comprises a back 11 and a seat cushion 12, the former, if desired, being adjustable relative to the latter; as shown, said seat 10 is mounted on two pairs of legs 13 that are carried on fixed pivots 14 and arranged generally parallel to move said seat between the full and dot-dash line positions shown, the full line position being the normal one. The present energy absorbing means 15 connects at one end 16 to the seat and at the other end 17 to a fixed point on the side opposite to that in the direction of which the seat is adapted to move. One or more such means 15 may be provided, as can be understood. The arrangement is such that, normally there is no movement of seat 10. However, under conditions of impact the means 15 will elongate as shown to permit a controlled and safe movement of the seat.

The energy absorbing means 15 comprises, generally, a die-holding unit 18, and a draw rod 19 extending therethrough. One end of unit 18 may be coincidental to the end 16. However, in most instances, a connecting link 20 is employed to connect unit 18 to the point 16 of its connection to seat 10 or a comparable device. Draw rod 19, as in Fig. 6, may be provided with an eye 21 for effecting connection to point 17. Where initial adjustment is needed, said rod 19 may be connected, by a length-adjusting turn-buckle 22, to a link 23 that has eye 21.

The die-holding unit comprises a suitable forging or casing 24 that, at one end, is provided with a die-holding part 25 in which there is formed a seat 26 for a hardened draw die 27; a pair of spaced arms 28 extends from part 25 and is connected by a bolt 29 which serves also to connect link 20 with unit 18. Between the die 27 and said bolt, the unit is provided with fixed shoe means 30 over which draw rod 19 bends as the same is drawn through the die.

The draw die is advantageously made of hardened steel and is formed with an axial passage 31 that has a flared end 32 on the side directed toward shoe means 30. It is obvious that a rod of suitable malleability and having a diameter greater than that of passage 31 may be drawn through said passage and in the process is reduced to the diameter of the passage and simultaneously elongated. Consequently, a force exerted on end 16, in a direction away from end 17, will have its energy absorbed during such extrusion.

The draw rod 19 is formed of a malleable metal that affords natural metallic lubrication between itself and die 27. Thus, for a steel die, said rod is advantageously made of copper or copper alloy. As shown in Figs. 1, 2 and 3, draw rod 19 is formed as an elongated member which deviates from a straight line only by the inclusion of a shallow bend 33 where the same is trained over the guide afforded by the shoe means 30. Thus, if clearance problems are not involved, the free end 34 of draw rod 19 extends at an angle to the operating axis of unit 18. Should such a disposition of end 34 effect interference with other elements, and should there be sufficient lateral clearance for said end, the draw rod may be given the form of a helix 35 as in Fig. 4. Also, where neither forward nor lateral clearance is available, the free end 34 may be given the form of a flat spiral 36 as in Fig. 5. The three forms shown are exemplary of how the draw rod may be trained for specific conditions.

Rod 19 is initially provided with a point 42 that is small enough to freely enter die 27 and the same is preferably threaded to effect connection with a turn-buckle 22 or other connecting means.

While this disclosure speaks of element 19 as a rod, the same may be formed as a tube, the essential physical characteristic being that the element is integral rather than woven, braided or similarly fabricated.

For conditions requiring a uniform rate of energy absorption, the draw rod is of uniform diameter throughout. From Fig. 7 it will be seen that displacement of a seat 10 or, in other words, elongation of the draw rod, involves a uniform rate of energy absorption. The initial overcoming of the inertia of the molecules of the draw rod first causes a rapid rate of absorption per elongation or displacement, as indicated by graph line 37. Then, as flow of the molecules is started, the rate of energy absorption remains substantially constant as indicated by line 38. Thus, the total energy absorption throughout the length of displacement may be depicted by a straight graph line 39.

The draw rod 40 shown in Fig. 6 is increasingly tapered toward its free end and, while shown straight, may be helically or spirally formed as above indicated. Such a draw rod would be used where an increasing rate of absorption is required. The line 41 of Fig. 7 indicates how the absorption rate increases per unit of displacement or elongation as increasingly larger successive portions of said rod pass through die 27. Since, initially, there is little diameter differential between the drawn or extruded point 42 and the adjacent unextruded portions of the draw rod, the displacement is proportionally greater for the absorption rate than was had with a rod of uniform diameter. As the unworked portion increases in diameter, the displacement shortens as the rate of absorption increases. Consequently, the total energy absorption first builds up slowly and increases more rapidly as suggested by graph line 43.

If desired, the several described forms of draw rod 19 may, at their free ends, be provided with a draw-limiting head 44, the same simply comprising a portion which tapers relative to a uniform rod or increasingly tapers relative to a tapered rod. The action of head 44 is reflected as a rapid increase in the rate of energy absorption, as shown by graph line portions 45, and a slowing up of displacement or elongation relative to total energy absorption, as shown by graph line portions 46.

While dissimilar metals for the die and draw rod are preferred, the latter may be made with a core of the same metal as the die and coated or plated with a dissimilar metal, provided, however, that said core has malleability comparable to that of the coating.

Since the present energy absorbing devices function only under stress of extremely large and sudden forces, as are produced by abnormal impacts, replacement of an attenuated draw rod is made only after such infrequent operation. At other times the absorbers function as structural elements that are in tension until the forces are of such magnitude as to overcome the force needed to attenuate the draw rod as the same is passed through the die or dies.

While the invention that has been illustrated and described is now regarded as the preferred embodiments, the constructions are, of course, subject to modifications without departing from the spirit and scope of the invention. It is therefore not desired to restrict the invention to the particular forms of construction illustrated and described, but to cover all modifications that may fall within the scope of the appended claims.

Having thus described the invention, what is claimed and desired to be secured by Letters Patent is:

1. An energy-absorbing link comprising a first non-yielding connecting link, a member comprising a die-holding end and a pair of spaced arms extending from said end and connected to said connecting link, a die having a draw passage in said die-holding end and open at one end to the space between the mentioned arms, a second non-yielding connecting link, a ductile elongatable draw rod extending through said die and having a reduced end directed away from said member, a turnbuckle connecting said reduced end of the rod and the second connecting link, said connecting links, member and die passage, and reduced end of the draw rod being arranged in a straight line between the outer ends of said connecting links, and said draw rod having an elongated end larger in cross-sectional size than the die passage and extending in a direction toward the first connecting link and between the mentioned arms.

2. An energy-absorbing link comprising a first non-yielding connecting link, a member comprising a die-holding end and a pair of spaced arms extending from said end and connected to said connecting link, a die having a draw passage in said die-holding end and open at one end to the space between the mentioned arms, a second non-yielding connecting link, a ductile elongatable draw rod extending through said die and having a reduced end directed away from said member, a turnbuckle connecting said reduced end of the rod and the second connecting link, said connecting links, member and die passage, and reduced end of the draw rod being arranged in a straight line between the outer ends of said connecting links, said draw rod having an elongated end larger in cross-sectional size than the die passage and extending in a direction toward the first connecting link and between the mentioned arms, and a shoe across the space between the arms and displaced out of line of said larger end of the draw rod, said draw rod having an extension trained over said shoe and directed angularly outward from between said arms and the shoe to straighten and guide the latter extension through the die during pull between the outer ends of the two connecting links.

3. An energy-absorbing link according to claim 1: the larger-sectioned portion of the draw rod from the die toward its end being increasingly tapered.

4. An energy-absorbing link according to claim 2: the angularly directed portion of the draw rod having a helical form arranged laterally of the die-holding member.

5. An energy-absorbing link according to claim 2: the angularly directed portion of the draw rod having a flat spiral form arranged laterally of the die-holding member.

References Cited in the file of this patent

UNITED STATES PATENTS

| Number | Name | Date |
| --- | --- | --- |
| 1,896,674 | Longwell | Feb. 7, 1933 |
| 1,951,073 | Wallis | Mar. 13, 1934 |
| 2,050,187 | Klemperer et al. | Aug. 4, 1936 |
| 2,117,932 | Anker | May 17, 1938 |
| 2,227,717 | Jones | Jan. 7, 1941 |
| 2,252,365 | Fisher | Aug. 12, 1941 |
| 2,401,748 | Dillon | June 11, 1946 |
| 2,578,753 | Smith | Dec. 18, 1951 |
| 2,578,903 | Smith | Dec. 18, 1951 |
| 2,615,373 | Pegard | Oct. 28, 1952 |

FOREIGN PATENTS

| Number | Country | Date |
| --- | --- | --- |
| 833,574 | France | Oct. 25, 1938 |
| 985,014 | France | July 13, 1951 |